United States Patent Office 2,780,518
Patented Feb. 5, 1957

2,780,518

PROCESS FOR RECOVERY OF URANIUM FROM AQUEOUS SOLUTIONS

John W. Gates, Jr., Rochester, N. Y., and Lawrence J. Andrews, Davis, Calif., assignor, by mesne assignments, to the United States of America as represented by the United States Atomic Energy Commission No Drawing. Application April 5, 1946,
Serial No. 659,854

12 Claims. (Cl. 23—14.5)

The present invention relates to the recovery of uranium from aqueous solutions containing fluoride ions, and particularly to an improved process for the solvent extraction of uranium from dilute aqueous solutions containing fluorides.

It has previously been found that the presence of fluorides may seriously interfere with quantitative recovery of uranium from aqueous solutions by methods such as precipitation of insoluble uranium compounds, solvent extraction of uranium, and the like. This problem assumes special importance in the processing of solutions of a pure uranium isotope, or an enriched uranium fraction, in which case even a very slight reduction in overall recovery can mean a very serious economic loss.

An object of the present invention is to provide methods for substantially quantitative recovery of uranium from aqueous solutions containing fluorides.

Another object is to provide an improved solvent extraction method for the recovery of uranium from aqueous solutions containing fluoride ions.

A further object of this invention is to provide a combination precipitation-solvent extraction process adapted for the recovery of uranium from dilute aqueous solutions containing fluorides. Other objects and advantages of our invention will be evident from the following description.

In accordance with the present invention aluminum ions are incorporated in an aqueous solution containing uranium and fluoride ions in order to complex the fluoride and minimize its interference with the extraction of the uranium by means of organic solvents.

The uranium solutions which may be extracted in accordance with the present process may be neutral or acidic aqueous solutions of uranium salts which are soluble in organic solvents. Suitable solutions comprise substantially neutral aqueous solutions or aqueous inorganic acid solutions of inorganic uranium salts, especially uranyl salts. The preferred solutions comprise substantially neutral aqueous solutions or aqueous nitric acid solutions of uranyl nitrate. The uranium content may range from trace quantities to saturation, but the process is especially useful for the recovery of uranium from relatively dilute solutions. The fluoride content of the solutions may vary from trace quantities to 150 grams of fluorine per liter, or even more, but is preferably not substantially above 100 grams per liter.

The aluminum may be incorporated in the solution in the form of any soluble aluminum compound which will provide aluminum ions to complex the fluoride. A suitable aluminum compound comprises an inorganic aluminum salt having the same anion as the uranium compound in solution. For the preferred uranyl nitrate solutions, aluminum nitrate is the preferred complexing agent. The aluminum concentration should be sufficient to provide an atomic ratio of aluminum to fluorine of at least 1 to 3 and preferably about 1 to 1.

In order to increase the efficiency of the extraction of uranium by the organic solvent, it is preferred to incorporate a salting-out agent in the aqueous phase. Any of the salting out agents which have previously been used for uranium extraction may be employed for this purpose. A salting-out agent is suitably a soluble inorganic salt having the same anion as the uranium compound in solution. In the case of the preferred uranyl nitrate solutions, the salting-out agents are suitably nitrates such as ammonium, sodium, calcium, magnesium, and copper nitrates. Aluminum nitrate may be utilized simultaneously as a complexing agent and as a salting-out agent if desired. Although any substantial concentration of salting-out agent will improve the efficiency of the extraction, a concentration of at least 5 M. in the aqueous phase is desirable, and it is preferable to saturate the aqueous phase with respect to the salting-out agent.

Any of the organic solvents which have previously been employed for uranium extraction may be used in the process of the present invention. Suitable solvents comprise organic compounds which are substantially immiscible with the aqueous phase to be extracted, and which contain at least one atom capable of donating an electron pair to a coordination bond. The preferred solvents contain at least one oxygen atom capable of donating an electron pair to a coordination bond. Such solvents include ethers, ketones, esters, and nitrohydrocarbons. The preferred solvents are ethers, especially alkyl ethers such as ethyl and propyl ethers, and glycol ethers such as "dibutyl Cellosolve" i. e., 1,2-dibutoxy ethane, and "dibutyl Carbitol," i. e. 1-butoxy-2-($\beta$-butoxyethoxy)ethane.

The extraction may be effected by any suitable process such as by batch, continuous batch, batch counter-current, or continuous counter-current procedures. From four to eight successive batch extractions employing a volume of organic solvent in each extraction about ¼ the volume of the aqueous phase will generally be sufficient to effect substantially quantitative recovery of uranium. Other extraction procedures of equivalent efficiency will, of course, be equally suitable.

At the conclusion of the extraction, the uranium may be recovered from the organic phase by any suitable process, such as by evaporation or by re-extraction into an aqueous solvent followed by precipitation of an insoluble uranium compound from the aqueous solution.

It will be apparent that many modifications of the procedure described above may be employed. In one such modification, the aluminum ions for complexing the fluoride may be provided in a preceding process step rather than added directly to the solution to be extracted. In a preferred process of this type the aluminum and uranium are co-precipitated from an aqueous fluoride containing solution, for example, as a mixed precipitate of aluminum hydroxide and calcius diuranate, and the precipitate is then dissolved to form the aqueous phase for solvent extraction.

Our invention will be further illustrated by the following specific examples:

Example I

Substantially neutral solutions containing 6.25 g. of uranium per liter, as uranyl nitrate, with and without added fluoride as sodium fluoride, and aluminum as aluminum nitrate, were saturated with calcium nitrate by the addition of solid $Ca(NO_3)_2 \cdot 4H_2O$ and were then extracted with dibutyl carbitol. Six successive extractions were made in each case, using for each extraction a volume of dibutyl carbitol approximately 25% the volume of the aqueous phase. The total extract from each aqueous solution was then analyzed for uranium content to determine the percent uranium recovery. The results are shown in the table below:

| g. F per liter | g. Al per liter | Percent U recovery |
|---|---|---|
| 0.0 | 0.0 | 99.9 |
| 100.0 | 0.0 | 86.9 |
| 100.0 | 142.0 | 99.6 |

The above example illustrates the adverse effect of a high concentration of fluoride ion and the successful counteraction of this effect by aluminum complexing. The following example illustrates the equal effectiveness of aluminum complexing at lower fluoride concentrations:

Example II

Substantially neutral aqueous solutions containing 6.25 g. of uranium per liter, as uranyl nitrate, and 12.5 g. of chromium per liter, as chromic nitrate, with and without added fluoride as sodium fluoride, and aluminum as aluminum nitrate, were saturated with calcium nitrate by the addition of solid $Ca(NO_3)_2 \cdot 4H_2O$ and were then extracted with dibutyl Carbitol. Six successive extractions were made in each case, using for each extraction a volume of dibutyl Carbitol approximately 25% the volume of the aqueous phase. The total extract from each aqueous solution was then analyzed for uranium content to determine the percent uranium recovery. The results are shown in the table below:

| g. F per liter | g. Al per liter | Percent U recovery |
|---|---|---|
| 0.0 | 0.0 | 100.0 |
| 16.2 | 0.0 | 96.0 |
| 16.2 | 46.1 | 99.3 |

Example III

Aqueous solutions of pH 2–3 were prepared containing 17 g. per liter of $Al(NO_3)_3 \cdot 9H_2O$ and 0.005–0.050 g. per liter of uranium as uranyl nitrate. To such solutions, with and without added fluoride as hydrofluoric acid, there was added 20% by volume of an aqueous solution containing 100 g. of slaked lime per liter, in order to coprecipitate the aluminum and uranium as aluminum hydroxide and calcium diuranate. The precipitate in each case was dissolved in a minimum volume of 1/1 aqueous nitric acid, and the resulting solution was saturated with copper nitrate and extracted with an equal volume of ethyl ether. The extract in each case was analyzed for uranium content to determine the percent uranium recovery. It was found that in the presence of aluminum, the fluoride ion did not interfere with uranium recovery, as shown by the results in the table below:

| U concentration, g. per liter | Moles HF per mole $Al(NO_3)_3$ | U recovery, percent |
|---|---|---|
| 0.005 | 0.0 | 100.0 |
| 0.005 | 1.0 | 100.0 |
| 0.050 | 1.0 | 99.2 |

It is to be understood, of course, that the above examples are merely illustrative, and do not limit the scope of our invention. Other aluminum complexing agents, other salting-out agents, and other organic solvents may be substituted for those employed in these examples, and the procedures may be modified in numerous respects within the scope of the foregoing description. In general it may be said that the use of any equivalents or modifications of procedure which would naturally occur to those skilled in the art is included in the scope of the present invention. Only such limitations should be imposed on the scope of our invention as are indicated in the appended claims.

We claim:

1. A process for the separation of uranium from an aqueous solution containing a uranium compound and fluoride ions, which comprises providing in said solution sufficient aluminum ions to complex substantially all of said fluoride, contacting the resulting solution with an organic solvent for said uranium compound which is substantially immiscible with said solution, and separating the resulting extract and raffinate phases.

2. A process for the separation of uranium from an aqueous solution containing a uranium compound and fluoride ions, which comprises providing in said solution sufficient aluminum ions to complex substantially all of said fluoride, providing in said solution a salting-out agent having the same anion as said uranium compound, contacting the resulting solution with an organic solvent for said uranium compound which is substantially immiscible with said solution, and separating the resulting extract and raffinate phase.

3. A process for the separation of uranium from an aqueous solution containing uranyl nitrate and fluoride ions, which comprises providing aluminum nitrate in said solution in a concentration at least sufficient to complex substantially all of said fluoride, providing in said solution a nitrate salting-out agent in substantially saturation concentration, contacting the resulting solution with an organic solvent for uranyl nitrate which is substantially immiscible with said solution, and separating the resulting uranium-containing organic extract phase from the aluminum-containing aqueous raffinate phase.

4. The process of claim 3 in which the organic solvent is an ether.

5. The process of claim 3 in which the organic solvent is ethyl ether.

6. The process of claim 3 in which the organic solvent is a glycol ether.

7. The process of claim 3 in which the organic solvent is 1-butoxy-2-($\beta$-butoxyethoxy)ethane.

8. A process for the recovery of uranium from an aqueous solution containing uranyl nitrate and fluoride ions which comprises providing aluminum nitrate in said solution in a concentration in excess of that required to complex all of said fluoride, incorporating hydrated calcium oxide in the resulting solution to co-precipitate aluminum hydroxide and calcium di-uranate, separating the resulting precipitate from the supernatant solution, dissolving the separated precipitate in aqueous nitric acid, incorporating a soluble nitrate salting-out agent in the solution thus obtained, contacting the resulting solution with an organic solvent for uranyl nitrate which is substantially immiscible with said solution, and separating the resulting uranium-containing organic extract phase from the aluminum-containing aqueous raffinate phase.

9. The process of claim 8 in which the organic solvent is an ether.

10. The process of claim 8 in which the organic solvent is ethyl ether.

11. The process of claim 8, in which the organic solvent is a glycol ether.

12. The process of claim 8, in which the organic solvent is 1-butoxy-2-($\beta$-butoxyethoxy)ethane.

References Cited in the file of this patent

UNITED STATES PATENTS 2,227,833    Hixson et al. _____ Jan. 7, 1941

OTHER REFERENCES

Misciatelli, Gazzetta Chimica Italiana, vol. 60, page 833 (1930.)